(12) United States Patent
Chang et al.

(10) Patent No.: US 6,816,909 B1
(45) Date of Patent: Nov. 9, 2004

(54) STREAMING MEDIA PLAYER WITH SYNCHRONOUS EVENTS FROM MULTIPLE SOURCES

(75) Inventors: Subrina Sih-Pin Chang, Old Tappan, NJ (US); Jeane Shu-Chun Chen, Chappaqua, NY (US); Ephraim Feig, Chappaqua, NY (US); Liang-Jie Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/396,946

(22) Filed: Sep. 15, 1999

Related U.S. Application Data

(60) Provisional application No. 60/100,669, filed on Sep. 16, 1998.

(51) Int. Cl.[7] .............................................. G06F 15/16
(52) U.S. Cl. ....................... 709/231; 709/217; 709/219; 709/227; 709/236; 725/91; 725/93
(58) Field of Search ................................ 709/227, 236, 709/231, 217, 219; 710/52; 725/36, 91, 93, 87

(56) References Cited

U.S. PATENT DOCUMENTS

| | | | |
|---|---|---|---|
| 5,793,980 A | * 8/1998 | Glaser et al. ............... 370/352 |
| 5,822,537 A | * 10/1998 | Katseff et al. ............... 709/231 |
| 5,933,835 A | * 8/1999 | Adams et al. ................. 707/10 |
| 6,151,634 A | * 11/2000 | Glaser et al. ............... 370/476 |
| 6,449,653 B2 | * 9/2002 | Klemets et al. ........... 348/423.1 |

* cited by examiner

Primary Examiner—Frantz B. Jean
Assistant Examiner—Kevin Parton
(74) Attorney, Agent, or Firm—David M. Shofi; Anne V. Dougherty

(57) ABSTRACT

A buffering protocol and a streaming media player which utilizes the buffering protocol designed for minimizing the occurrences of pauses during the presentation due to network congestion and for scheduling pauses at appropriate times in the presentation. The data comprises coded content information comprising a time synchronous media, together with various other sources, synchronized to appear at predetermined time points in the media presentation. The presentation is delivered in streaming fashion, so that the end user does not have to wait for the entirety of the data to be downloaded before starting the presentation. The invention does not require that media data and events data be multiplexed into a single streaming file and it does not require that the file provided to the media player be customized for prefetching of content.

17 Claims, 5 Drawing Sheets

A presentation covered by the invention

Augmented Audio File format

AAF player presentation through a Netscape browser

STREAMING MEDIA PLAYER WITH SYNCHRONOUS EVENTS FROM MULTIPLE SOURCES

This application claims the benefit of Provisional application Ser. No. 60/100,669, filed Sep. 16, 1998.

FIELD OF THE INVENTION

The invention relates to the provision of multimedia presentations at a user computer and more particularly to a streaming media player capable of synchronizing content from different sources into a multimedia presentation for display at the user location.

BACKGROUND OF THE INVENTION

The Internet and various intranets are well known communication networks for the transfer of digital data. While most of the data transmitted on these networks correspond to text or certain computer programs, more and more of it now pertains to multimedia content such as images, audio and video.

A hypertext document is one which is linked to other documents via hyperlinks. A hyperlink often appears in a hypertext document as a piece of highlighted text. The text is usually a word or phase describing something for which a user might wish to obtain further information. When the user activates the hyperlink, typically by clicking on it using a mouse, a link command is initiated; which causes a program at the linked address to be executed; which, in turn, causes the user's view to be updated so as to show the linked document, typically containing more information on the highlighted word or phase. Such information may be in the form of text, audio, video, a two-dimensional image or a three-dimensional image. Hyperlinks make it easy to follow cross-references between documents. Hypermedia documents are hypertext documents with multimedia capabilities. The regions on the screen which are active hyperlinks are called hot-links.

Nowadays, most people are familiar with the application of hypertext by using a mouse to click on a hot-ink provided on a computer display of a homepage from the World Wide Web (the Web) on the Internet. Data on the Web is located via Uniform Resource Locators, or URLs. URLs comprise the draft standard for specifying an object on the Internet. Each URL specifies the access method and the location for the files. Documents on the Web are written in a simple "markup language" called HTML, which stands for Hypertext Markup Language. File formats of data on the Web are specified as MIME formats; MIME stands for "Multipurpose Internet Mail Extensions." (Reference: http://www.oac.uci.edu/indiv/ehood/MIME/MIME.html). Examples of file formats on the Web are .au (probably the most common audio format), .html (HTML files), .jpg (JPEG encoded images), .mid (Midi music format), mpg (MPEG encoded video), and .ps (postscript files). While presently hypertext technology is most common in text and image media, it is beginning to also appear in animation, video and audio.

Audio is also encoded in wav format and stored in files labeled with the suffix wav. Wav audio is not compressed beyond the quantization due to sampling rate and bits per sample. Radio quality audio is typically 22,050 Hz sampled at 8 bit per channel stereo, which give an encoding at data rates of 43 KBps. Reasonable quality speech can be obtained at 11,025 Hz sampling, 8 bit mono, yielding data rates of 11 KBps. MPEG provides various standards for audio compression, typically derived from 44,100 Hz sampling stereo at 16 bit per sample. MPEG audio is typically compressed to between 16 Kbps to 384 Kbps. Other standards tailored to speech signals compress to as 5 Kbps; these include G.723 and GSM.

Typical Web servers follow the HTTP protocol. When a user requests the content of a URL on a server, the entire content associated with that URL is sent to the user's client machine. Such content may be comprised of an html or htm document with auxiliary information attached to it, such as images and perhaps animation software. The server will commence sending the data and continue sending same until either it has completed sending all the data or until it has received a message from the client to stop sending any more data. Some servers serve in streaming mode, wherein data is sent at some prescribed average data rate, say K bits every N seconds. A streaming server is serviced by a scheduling algorithm to maintain this average data rate.

Media players for decoding and playing audio and video have been standard features on personal computers for more than a decade. Apple Computers had their QuickTime player, while machines running Microsoft's Windows operating system had the Microsoft Media Player. The players typically required that data for the entire content to be played be resident locally on the computer before the player could start playing. This meant that when media content was coming from some other source on the Web, the player would have to wait until all content was downloaded before starting to play. Recently media players have begun to support streaming capabilities. Streaming players buffer some data from outside sources on the Web and then start playing, even though much of the data has not yet arrived. If the data rate of the incoming data is not fast enough, the player would pause when the data in its buffer was depleted, rebuffer with more data, and then continue to play. An improved streaming media player is detailed in co-pending patent application Ser. No: 09/293,644, entitled "Variable Rate Streaming Media Player", which is assigned to the present assignee, wherein the media player can slow its playback if it detects a decrease in the buffering of incoming media content, based on network delays, etc.

Streaming media have found novel new applications. One such application is the delivery of audio presentations augmented with images or transparencies. The images are displayed at appropriate time intervals during the audio playback, as prescribed by the authors of the presentation. Various technologies have been invented to accommodate such presentations. Real Networks is using a file format called SMIL, which encapsulates all the relevant information in one file, makes certain that all the data that is required to be provided at a particular point in a presentation already be present at the client at such instant, and then streams this file using a streaming server at some prescribed data rate. Microsoft's NetShow utilizes a similar scheme but with its ASF data format. All known techniques for delivery of such synchronized content utilize a multiplexing of all the content into a single file, followed by streaming that file using a streaming server. Often, however, the two requirements of a single file and a streaming server are undesirable added complexities. An invention on which the present authors have filed a co-pending patent application, Ser. No. 04/396, 241, entitled "Efficient Streaming of Synchronized Web Content From Multiple Sources" filed simultaneously herewith and assigned to the present assignee, provides a solution without the two requirements, but needed special authoring to prepare auxiliary information to be sent to client players which are then utilized to schedule the various requests to the servers.

What is desirable, therefore, and what is an object of the invention, is to provide a system and method to enable the presentation of time synchronous content without the requirements of creating a single file, including a streaming server, or providing auxiliary information regarding the scheduling of requests.

Another object of the invention is to provide the foregoing in a system and method which requires only input of the time points in the presentation at which various images and events need to occur.

Yet another object of the invention is to provide the foregoing even if the various files do not reside on the same server.

SUMMARY OF THE INVENTION

These and other objects are realized by the present invention which provides for the delivery of data from one or more sources, typically web servers, over a communications network such as the Web or an intranet, to end users typically deploying computers. The invention describes a buffering protocol and a streaming media player which utilizes the buffering protocol designed for minimizing the occurrences of pauses during the presentation due to network congestion and for scheduling pauses at appropriate times in the presentation. The data comprises coded content information comprising a time synchronous media, such as audio or video, together with various other sources, such as images or events to be displayed on a monitor, synchronized to appear at predetermined time points in the media presentation. For example, the data may comprise all the information required for the presentation of a lecture using audio and images of accompanying transparencies, each transparency displayed at an appropriate interval of time during the audio presentation. The presentation is delivered in streaming fashion, so that the end user does not have to wait for the entirety of the data to be downloaded before starting the presentation, but rather can start viewing and listening to the presentation after a relatively short delay period. In case of network congestion, as if often experienced on the Web, some of the data necessary for the presentation at a particular instant of time might not yet have arrived, which causes the presentation to pause until the necessary data has arrived. Without the buffering protocol, such pauses will be arbitrary and perhaps frequent. The buffering protocol is ideally suited for streaming media players that do not utilize special streaming servers. The invention does not require that media data and events data be multiplexed into a single streaming file and it does not require that the file provided to the media player be customized for prefetching of content.

BRIEF DESCRIPTION OF THE INVENTION

The invention will now be described in greater detail with reference to the appended drawings wherein:

FIG. 1 provides an overview of the system for implementing the present invention;

Figure 4A:
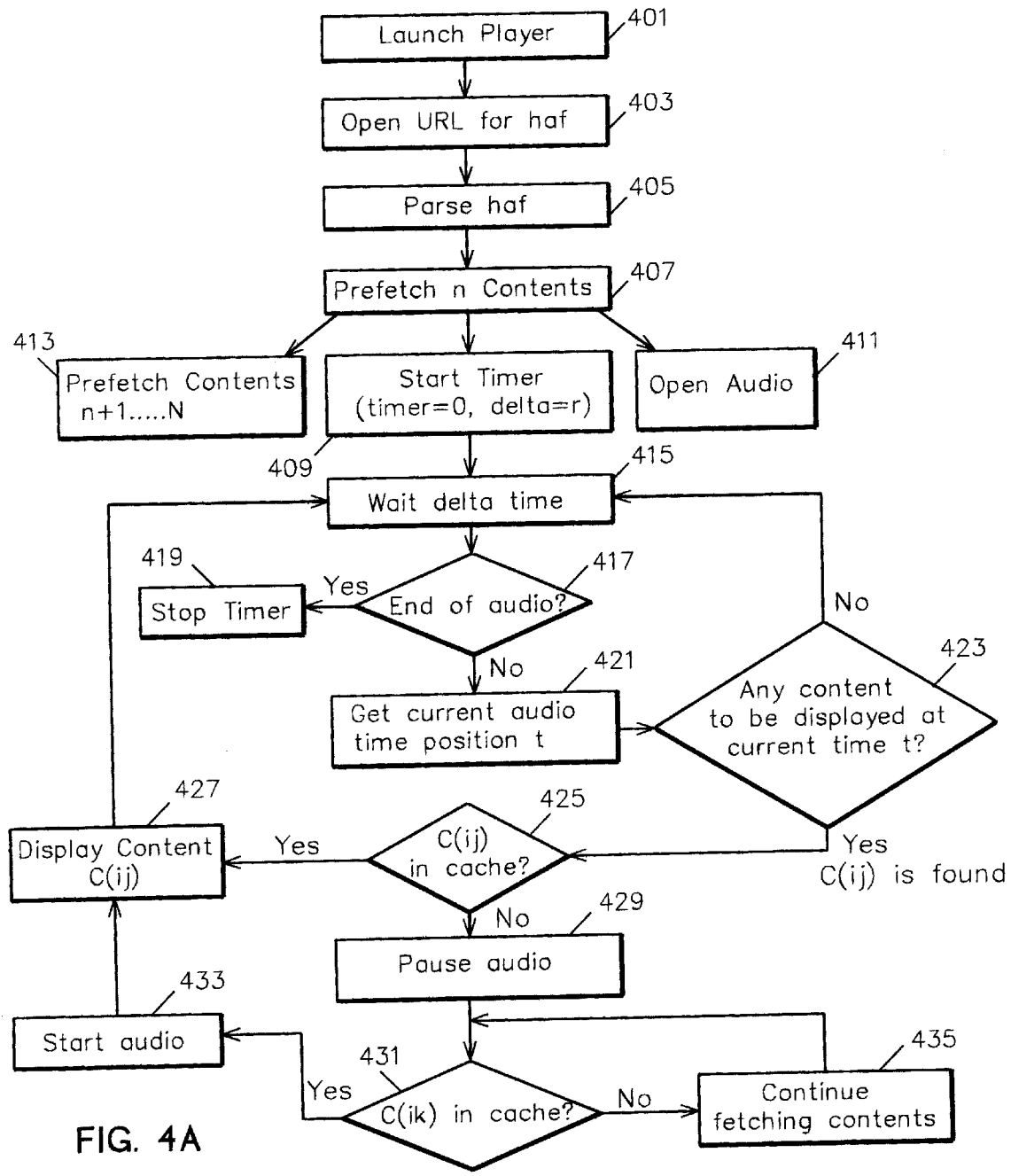
Figure 4B:
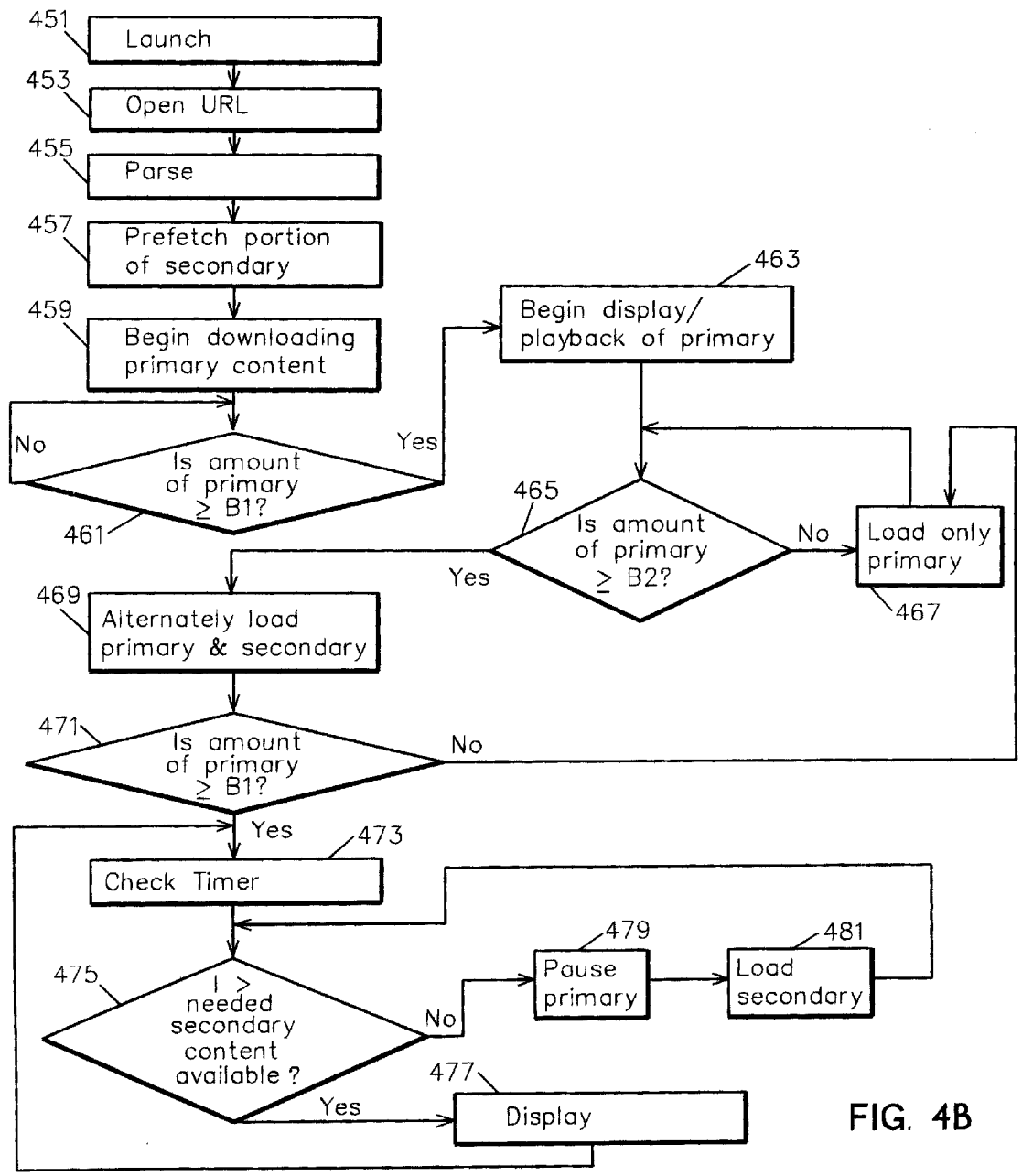
Figure 5:
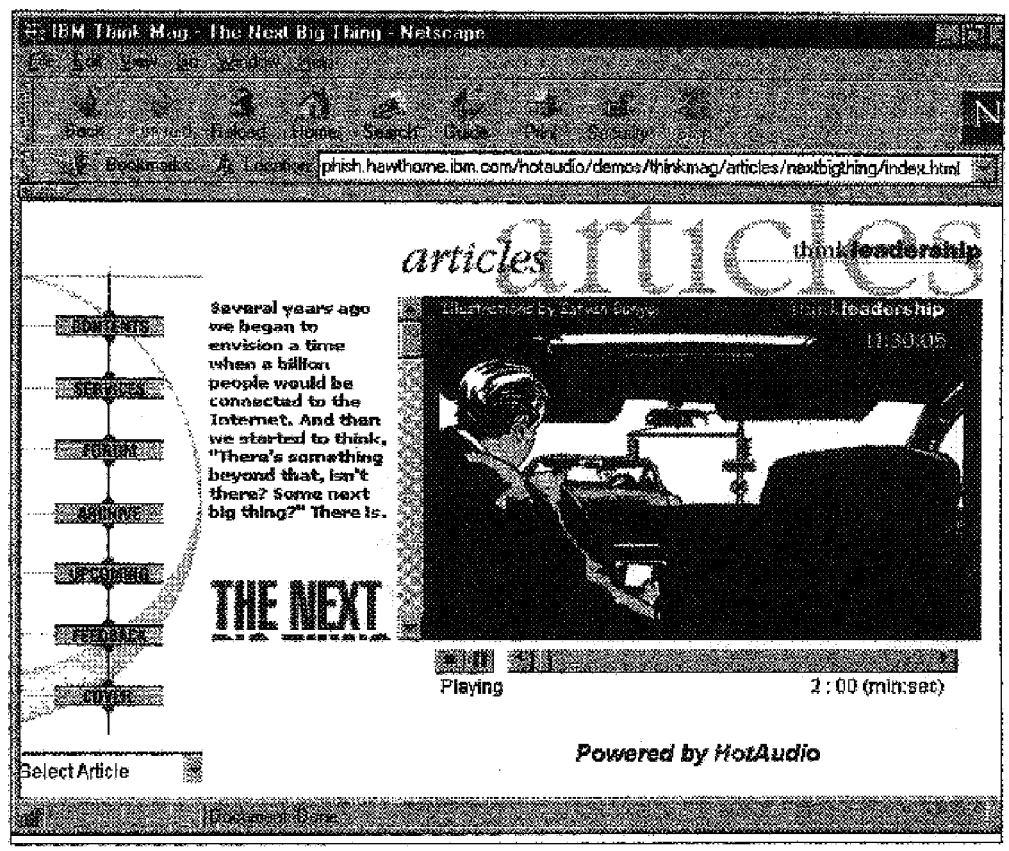

FIGS. 4A and 4B detail process flows for two implementation of the inventive media player; and FIG. 5 provides a representative player presentation as displayed via a Netscape browser.

DETAILED DESCRIPTION OF THE INVENTION

Figure 1:
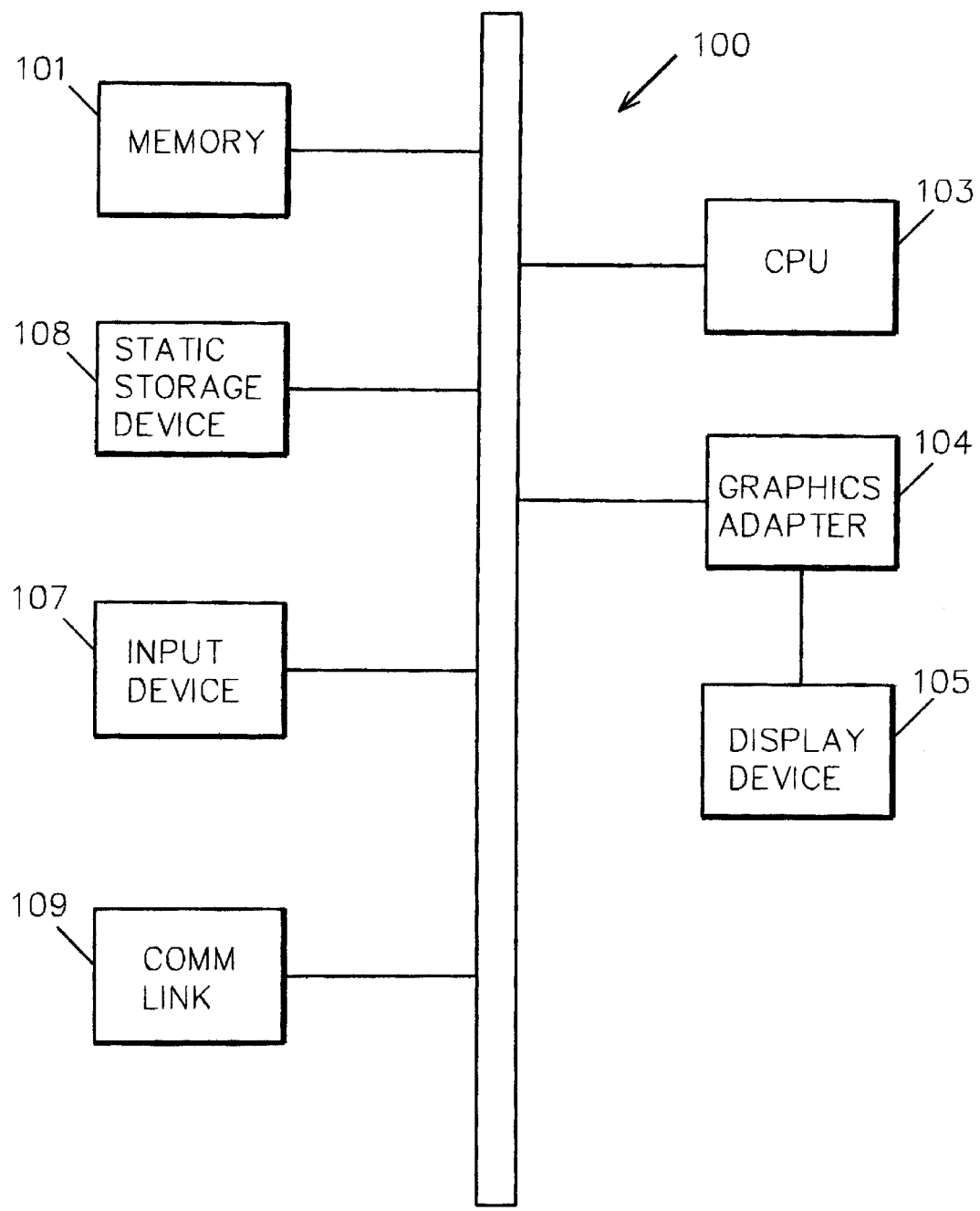

The present invention may be implemented on any computer processing system including, for example, a personal computer or a workstation. As shown in FIG. 1, a computer processing system 100 as may be utilized by the present invention generally comprises memory 101, at least one central processing unit (CPU) 103 (one shown), and at least one user input device 107 (such as a keyboard, mouse, joystick, voice recognition system, or handwriting recognition system). In addition, the computer processing system includes a nonvolatile storage location 108, such as a read only memory (ROM) and/or other nonvolatile storage devices such as a fixed disk drive, that stores an operating system and one or more application programs that are loaded into the memory 101 and executed by the CPU 103. In the execution of the operating system and application program (s), the CPU may use data stored in the nonvolatile storage device 108 and/or memory 101. In addition, the computer processing system includes a graphics adapter 104 coupled between the CPU 103 and a display device 105 such as a CRT display or LCD display. The application program and/or operating system executed by the CPU 103 generates graphics commands, for example, a command to draw a box (or window), a command to display a bit map image, a command to render a three-dimensional model, or a command to display a video file. Such commands may be handled by the application program/operating system executed by the CPU 103, or by hardware that works in conjunction with the application program/operating system executed by the CPU 103, wherein the appropriate pixel data is generated and the display at the display device 105 is updated accordingly.

In addition, the computer processing system may include a communication link 109 (such as a network adapter, RF link, or modem) coupled to the CPU 103, which link allows the CPU 103 to communicate with other computer processing systems over a communications network, for example over the Internet. The CPU 103 may receive, over the communication link 109, portions of the operating system, portions of the application program(s), or portions of the data used by the CPU 103 in executing the operating system and application program(s).

It should be noted that the application program(s)/ operating system executed by the CPU 103 may perform the methods of the present invention described below. Alternatively, portions or all of the methods described below may be embodied in hardware that works in conjunction with the application program/operating system executed by the CPU 103. In addition, the methods described below may be embodied in a distributed processing system whereby portions of such methods are distributed among two or more processing systems that are linked together via communication link 109.

Figure 2:
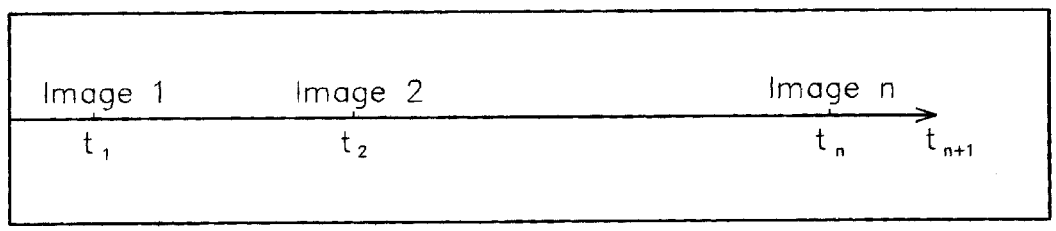
FIG. 2 illustrates a schematic representation of a presentation covered by the present invention.

The present embodiment involves the presentation of audio accompanied by images which appear during predetermined time intervals from t(i) to t(i+1) in the presentation. As will be apparent to one having skill in the art, while the presently described embodiment has audio as the primary content, with images as the secondary content, alternative media can be substituted for each. FIG. 2 gives a representation of the multimedia presentation. Image 1 is to be displayed during the time interval from t(1) to t(2), Image 2 is to be displayed during the time interval from t(2) to t(3), and so on, until the last image, Image n, is displayed between t(n) and t(n+1), where t(n+1) is the end of the presentation.

Figure 3:
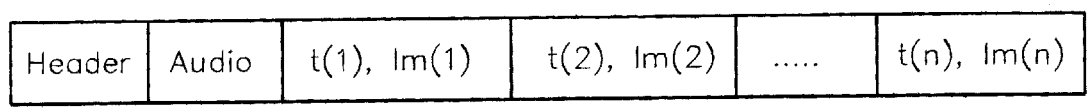
FIG. 3 illustrates an augmented audio file format for use with the present invention.

A file called Augmented Audio File (AAF) is created, which contains the information necessary to execute the presentation. FIG. 3 gives a description of the AAF file. The Header provides information regarding the overall structure of the presentation, including title, author information, authorization parameters and data of creation. The Audio block contains the URL of the audio file to be used. The t(j) are as above, the time points of the presentation when image(j) should be displayed; where, image (j) will be displayed from t(j) to t(j+1). The times are time increments of the audio presentation and do not represent absolute times, such that pauses in the audio presentation will not affect the timing instructions. Im(j) is the URL for the corresponding image (j).

A flowchart for one embodiment of an AAF player is given in FIG. 4A. The player is launched and parameters k, B1 and B2 are initialized at step 401. These parameters are the variables which can be set by the user in an options menu provided by the player. Also, a counter variable j is set to 1. The player then opens the URL for the AAF files at 403. It parses the AAF at 405 to obtain the information regarding the locations of the audio and image files and the times for displaying the images. It then proceeds to prefetch the first k images at step 407. After the first k images have been downloaded, the player starts a timer at 409, opens its audio component at 411 which starts first buffering audio content, and in parallel continues to buffer more image data at 413. Every delta time units as shown at 415, the player checks its status; with the delta being relatively small, typically less than 100 milliseconds. After some predetermined amount of the audio data B1 has been buffered, the player starts playing the audio. Once the audio starts, it will continue until either it ends or the buffer is prematurely depleted at which point the audio will automatically stop. The timer continues and, after every delta time unit(s), the player checks at 417, to determine if the audio is finished, or if the audio player has stopped and the buffer is greater than or equal to B1. If the audio is finished, the player stops as shown at 419. Otherwise, either the audio player continues or the player will wait until enough audio data has arrived in the buffer so that it can restart the audio player and continue with the presentation. Meanwhile, in parallel, the player determines the current audio time position and compares the current audio time t with t(j), at steps 421 and 423, respectively. If t is greater than or equal to t(j), then the player checks to see if the content for image (j) is already in local cache at step 425. If the necessary image is in the cache, it is displayed at 427. Because k images have already been cached, and k is at least 1, the display of image (1) should occur almost immediately after the player requests it. The player also updates the variable j by incrementing its value by 1.

The player proceeds, checking after every delta time units and making decisions according to the flow chart of FIG. 4A. As long as k images, image (j) through image (j+k+1), are present in the cache, the player will continue to play. If the entire presentation has n images, and the value j+s is greater than n, for 0<s<k, then image (j+s) is defined to be the empty set and it is assumed that it is present in the cache. This is simply a notation convention to simplify the description of the flowchart in FIG. 4A. If, on the other hand, not all of the k images, image (j) through image (j+k+1), are present in the cache as determined at 425, then the player pauses the audio at 429, until such time as all those images arrive. Note that the pause will happen at that point in time when t is at least t(j), so that the pause will happen very close to the time when an image transition should occur. In that way, the pause is least noticeable and least offensive to a viewer of the presentation. Once an amount of image content is in the cache, as determined at 431, the audio is restarted at 433. It is to be noted that the parameters for the system may be set such that the audio will be paused not only until the image (j) is cached, but until the preset number k images are cached, as per steps 431 and 435, to decrease the likelihood of another audio pause-at least in the short term.

An alternative embodiment may be implemented in a bandwidth constrained system wherein it is not possible to receive/download primary and the secondary media content in parallel. In such a system, as detailed in FIG. 4B, after receipt of the file and parsing of same at steps 451 and 453, the streaming media player accesses the source of the secondary media content (e.g., the image content source) and prefetches, at 457, a first portion representing at least the first amount of secondary media content to be inserted at t(l) of the primary media stream. Once the first portion has been downloaded at 457, the player accesses the primary content using the URL, and downloads the primary content at 459. The amount in the first buffer is monitored and compared to a first threshold at 461. When the amount is at least equal to that first threshold, B1, the player begins display of the primary content (i.e., the audio) at 463 and continues to monitor the amount in the first buffer. When the amount of primary content in the first buffer reaches a second threshold of B2, as determined at 465, the player be gins alternately receiving the primary and the secondary content (i.e., the audio and the image data) at 469. If the amount of primary content is below B2 (yet still above B1), the player continues to load the primary data at 467 and continues to monitor the amount for comparison at 465 to threshold B2. During the alternate receiving of primary and secondary data, the player continues to monitor the amount of primary content in the first buffer, and to compare that amount to the threshold B1, as shown in step 471. If the amount of primary content in the first buffer falls below B1, the alternate receiving is stopped and the player returns to step 467, at which only primary content is being downloaded, until the amount of contents again reaches B2. The contents of the second buffer, which holds the secondary content, is also monitored to ensure that the successively needed secondary content is available. This monitoring of the second buffer may be done continually or just at the t(j) points at which the (j) portion of the secondary content is to be displayed. As illustrated in the FIG. 4B process flow, the player consults the timer at step 473 and then checks the second buffer to determine, at 475, if the needed secondary content is available. If the content is available in the second buffer, the content is displayed with the primary content at step 477. If the needed portion of the secondary content has not been downloaded, as determined at 475, then the player pauses rendering/display of the primary content at step 479 until the needed secondary content is loaded at 481.

The actual layout of the display and the various buttons used to control other functions of the player, like start, stop, and random seek, are functions of the html document into which the player is embedded, and are not covered by this invention. FIG. 5 gives a view of a HotAudio presentation through a Netscape browser. The images above the scrollbar are updated dynamically during the presentation at appropriate predetermined time points in the presentation. The entire presentation is embedded in an html page which contains other content.

While the invention has been described with specific reference to preferred embodiments, it will be understood by oen having skill in the relevant art that certain modifications can be implemented without departing from the spirit and scope of the invention as set forth in the appended claims. For example, the terms "primary" and "secondary" have been used to refer to the media content and specifically to refer to audio and image content, respectively. Clearly, the primary content may be other than audio and the secondary content may be other than image to provide a variety of multimedia presentations in accordance with the inventive streaming media player and method taught herein.

Having thus described our invention, what is claimed is:

1. A method for a streaming media player having at least one first and one second buffer to provide portions of secondary media content from a second media source synchronized with streaming primary media content from a first media source, said first and second media sources being independent from each other and residing on physically separate first and second devices comprising the steps of:

receiving a file identifying primary and secondary media content and synchronization information;

downloading a first portion of said secondary media content from said second media source residing on said second device into said at least one second buffer;

beginning downloading of said primary media content from said first media source residing on said first device into said at least one first buffer;

when the amount of primary media content in said primary buffer reaches a first threshold, begin displaying said primary media content and said first portion of said secondary media content according to said synchronization information; and when the amount of primary media content in said primary buffer reaches a second threshold, greater than said first threshold, alternately receiving successive portions of said secondary media content with said primary media content.

2. The method of claim 1 further comprising monitoring the amount of primary media content in said primary buffer and when the amount falls below said first threshold, suspending alternately receiving and resuming downloading of primary media content until the amount reaches said second threshold.

3. The method of claim 2, further comprising the step of resuming alternately receiving primary and secondary media content once said second threshold is reached.

4. The method of claim 1 wherein said primary media content is audio and said secondary content comprises images which are synchronized to time increments in said audio.

5. The method of claim 4 wherein said first portion of said secondary media content comprises a preset number of images.

6. The method of claim 1 further comprising the steps of:

determining if a successive portion of secondary media content has been downloaded;

if said successive portion has been downloaded, displaying said successive portion in accordance with said synchronization information; and when said successive portion of secondary media content has not been downloaded, suspending displaying until said successive portion has been downloaded.

7. A streaming media player comprising:

at least one first buffer for buffering primary media content from a first media source residing on a first device;

at least one second buffer for buffering secondary media content from a second media source residing on a second device which is physically separate from said first device, said second media source being independent of said first media source;

playback means for rendering said primary content by streaming and for rendering portions of said secondary content with said primary content based on synchronization information and;

means for determining if a needed portion of said secondary media content is available at said second buffer and for signaling the playback means to pause if said needed portion of secondary media content is not available.

8. The player of claim 7 further comprising a processing component for receiving and parsing a presentation file comprising the locations of sources for primary and at least one secondary media content, the identity of the primary and at least one secondary media content, and synchronization information.

9. The player of claim 8 further comprising communications means for establishing communication with the locations of said sources and for receiving media content from said sources.

10. The player of claim 7 further comprising means for monitoring the amount of primary content in said first buffer.

11. The player of claim 10 further comprising means to initiate alternate downloading of primary and secondary content based on said monitoring.

12. A method for a streaming media player having at least one first and one second buffer to provide portions of secondary media content from a second media source synchronized with streaming primary media content from a first media source, said first and second media sources being independent of each other and residing on physically separate first and second devices comprising the steps of:

receiving a file identifying primary and secondary media content, physically separate device locations on which said independent first and second media sources for said primary and secondary media content reside, and synchronization information;

selectively accessing said first and second media sources at said first and second devices and selectively downloading portions of said primary and said secondary media content into said first and second buffers, respectively;

selectively retrieving downloaded portions of said primary and said secondary media content from said first and second buffers for display based on said synchronization information;

displaying said selectively accessed portions;

determining if a needed portion of secondary media content has been downloaded based on said synchronization information;

if said needed portion has been downloaded, displaying said needed portion in accordance with said synchronization information; and when said needed portion of secondary media content has not been downloaded, suspending displaying until said needed portion has been downloaded.

13. The method of claim 12, further comprising the steps of:

monitoring the amount of primary media content in said primary buffer; and when said amount of primary media content in said primary buffer reaches a first threshold, begin displaying said primary media content and a first portion of said secondary media content according to said synchronization information.

14. The method of claim 12, wherein said primary media content is audio and said secondary content comprises images which are synchronized to time increments in said audio.

15. A program storage device readable by machine, tangibly embodying a program of instructions executable by the machine to perform method steps for a media player having at least one first and at least one second buffer to display a multimedia presentation by providing portions of secondary media content from a second media source synchronized with streaming primary media content from a first media source, said first and second media sources being independent of each other and residing on physically separate first and second devices, said method comprising the steps of:

receiving a file identifying primary and secondary media content and synchronization information;

downloading a first portion of said secondary media content from said second media source residing on said second device into said at least one second buffer;

beginning downloading of said primary media content from said first media source residing on said first device into said at least one first buffer;

when the amount of primary media content in said primary buffer reaches a first threshold, begin displaying said primary media content and said first portion of said secondary media content according to said synchronization information; and when the amount of primary media content in said primary buffer reaches a second threshold, greater than said first threshold, alternately receiving successive portions of said secondary media content with said primary media content.

16. The program storage device of claim 15 wherein the method further comprises the steps of:

determining if a successive portion of secondary media content has been downloaded;

if said successive portion has been downloaded, displaying said successive portion in accordance with said synchronization information; and when said successive portion of secondary media content has not been downloaded, suspending displaying until said successive portion has been downloaded.

17. A program storage device readable by machine, tangibly embodying a program of instructions executable by the machine to perform method steps for a media player having at least one first and at least one second buffer to provide portions of secondary media content from a second media source synchronized with streaming primary media content from a first media source, said first and second media sources being independent of each other and residing on physically separate first and second devices, comprising the steps of:

receiving a file identifying primary and secondary media content, physically separate first and second device locations at which said independent first and second media sources for said primary and secondary media content reside, and synchronization information;

selectively accessing said first and second media sources and selectively downloading portions of said primary and said secondary media content into said first and second buffers, respectively;

selectively retrieving downloaded portions of said primary and said secondary media content from said first and second buffers for display based on said synchronization information;

displaying said selectively accessed portions;

determining if a needed portion of secondary media content has been downloaded based on said synchronization information;

if said needed portion has been downloaded, displaying said needed portion in accordance with said synchronization information; and when said needed portion of secondary media content has not been downloaded, suspending displaying until said needed portion has been downloaded.

* * * * *